April 25, 1944.   H. D. STARR   2,347,296
SEAL PACKING
Filed Oct. 27, 1941   2 Sheets-Sheet 1

Inventor
Howard D Starr
By Bryant & Lowry
Attorneys

April 25, 1944.　　　　H. D. STARR　　　　2,347,296
SEAL PACKING
Filed Oct. 27, 1941　　　　2 Sheets-Sheet 2
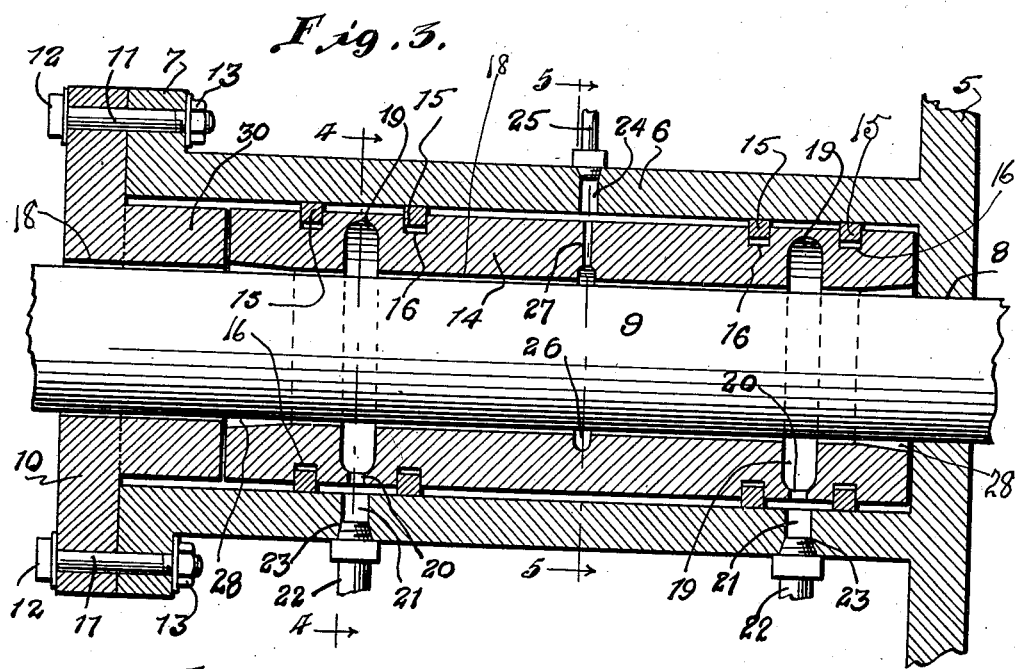
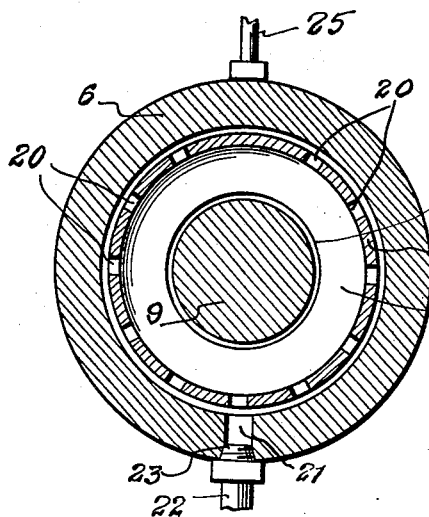
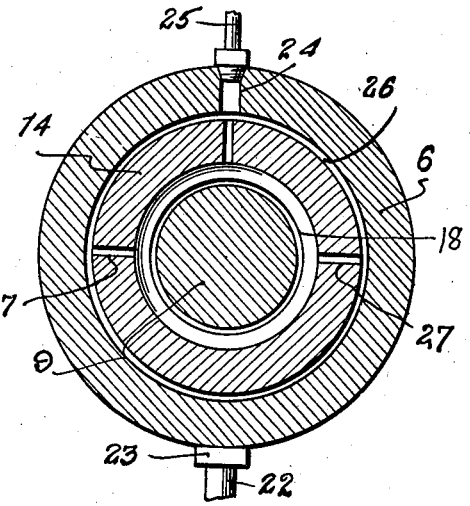
Inventor
Howard D. Starr
By Bryant & Lowry
Attorneys Patented Apr. 25, 1944

2,347,296

UNITED STATES PATENT OFFICE 2,347,296

SEAL PACKING

Howard D. Starr, Los Angeles, Calif.

Application October 27, 1941, Serial No. 416,759

4 Claims. (Cl. 286—19)

The present invention relates to improvements in seal packings and more specifically of the type in which a fluid is employed for the sealing medium.

The primary object of the invention is to provide a seal packing which will be particularly applicable to refrigerating machines to prevent the escape of refrigerating gas and liquids in the refrigerating system.

A further object of the invention is to provide a seal packing which will hermetically seal a shaft against the passage of gases or liquids without the aid of fibrous packing members or membranes, while at the same time providing a seal which requires very little attention during operating periods.

A still further object of the invention is to provide a seal packing which may be used with rotary shafting as well as reciprocating shafts requiring sealing means against the passage of gases and liquids.

Other objects and advantages of the invention will become apparent during the course of the following description of the accompanying drawings, wherein, Figure 1 is a sectional view of a casing member having an oil seal device associated therewith embodying the present invention;

Figure 3 is a longitudinal cross-sectional view illustrating in detail the construction of the casing member and seal therefor;

Figure 1:
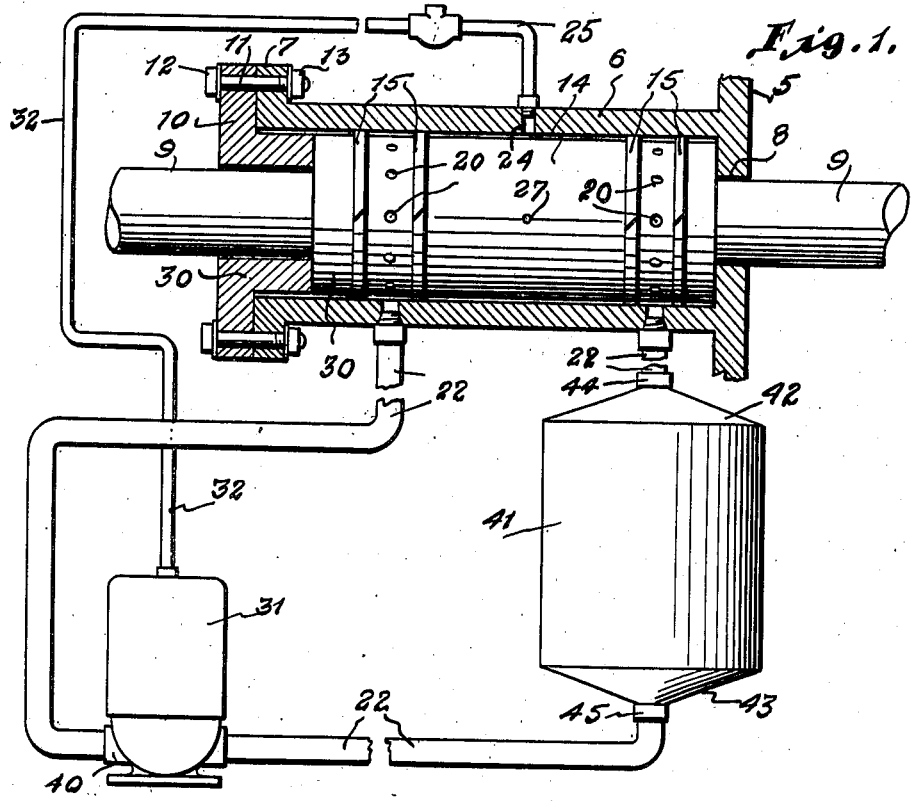
Figure 2:
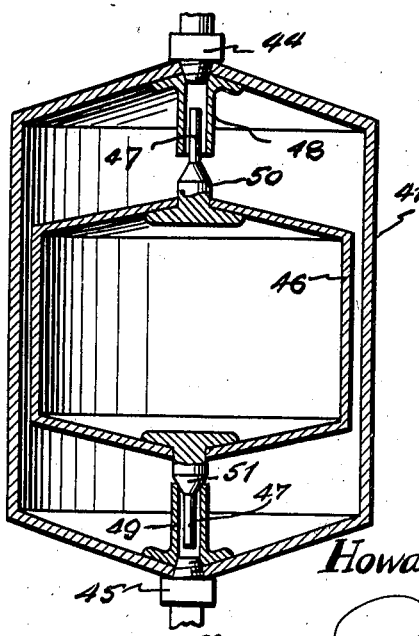
Figure 2 is a vertical cross-sectional view of a reservoir tank used in the liquid circulating system of the seal.

Figure 4 is a transverse sectional view taken on line 4—4 of Figure 3, looking in the direction of the arrows, showing in detail one of the oil seal cavities and the communicating perforations to the exhaust side of the system; and Figure 5 is a vertical cross-sectional view taken on line 5—5 of Figure 3, looking in the direction of the arrows, further illustrating the centralmost seal cavity associated with the entrance side of the system.

In the drawings, wherein for the purpose of illustrating the invention and wherein like reference characters will be employed to designate like parts throughout the same, the reference character 5 will generally be employed to designate the wall of a casing, such as a compressor or the like, and formed on the wall 5 is a tubular support 6 flanged as at 7 at its outer end.

Extending through an opening 8 in the wall 5 and coaxial with the support 6 is a shaft 9, which shaft may be capable of either reciprocatory or rotary motion. The opposite end of the shaft 9 is encircled by a cap 10 bolted to the flange 7 by means of bolts 11 having heads 12 and nuts 13 threaded on the free ends thereof.

Mounted in the tubular support 6 is a cylinder 14, the outer diameter of which is slightly smaller than the interior diameter of the support 6 so that a space will be provided for the passage of a sealing medium, such as oil or the like.

Each end of the cylinder 14 is provided with a pair of spaced packing rings 15 to seal the ends of the cylinder 14 against the escape of the sealing medium and said rings are received in grooves 16. The only support the cylinder 14 receives from tubular support 6 and cap 10 is that of preventing excessive movement endwise, clearance being allowed between cap 10 and the cylinder 14 to allow the cylinder to move sideways on a line at right angles to its axis. In order to allow this movement of the cylinder 14, the ring grooves 16 are cut deep enough to allow said cylinder to move in support 6 from one side to the other without contacting the rings in the bottoms of the grooves. The only support the cylinder 14 has to hold it centrally located is the shaft 9 which the cylinder 14 surrounds. This is in order that should the shaft 9 be somewhat off center in the support 6 the cylinder 14 will also be off center, in regard to support 6, an equal amount. This is in order that the cylinder 14 will remain exactly centralized around said shaft 9 regardless of the shaft's position in relation to support 6. It can therefore be seen that said cylinder 14 does not support the shaft 9, or form a bearing, but is for the sole purpose of directing the sealing medium along its proper channels, thereby creating a seal.

Extending axially through the cylinder 14 is a shaft opening 18 for receiving the shaft 9 and said opening 18 is slightly larger in diameter than the diameter of the shaft 9 so that a thin film of oil or sealing medium may provide an anti-friction surface between the shaft 9 and the cylinder 14.

Adjacent each end of the cylinder 14 and formed internally thereof is an annular cavity 19 and said cavities are located substantially midway between the packing rings 15. Radial openings 20 connect the annular cavities 19 to the space between the rings 15 and openings 21 are in alignment with the apertures 20 and are formed in the support 6 so that drain pipes 22 may be connected thereto by threaded connections 23.

A sealing medium such as oil or the like is admitted centrally to the support 6 by means of a passageway 24 having communication with the supply pipe 25, which is connected to a suitable source of supply under pressure.

Formed intermediate the ends of the cylinder 14 is an annular cavity 26 having radial passageways 27 whereby oil supply through the pipe 25 will find its way to the central annular cavity 26 and will be drawn to the end annular cavities 19 by pressure differences existing between the cavity 26 and the cavities 19. The sealing medium will then be turned to a circulatory system which will be hereinafter more fully described.

It is to be noted that the ends of the internal bore 18 of the cylinder 14 are slightly bevelled as at 28 to prevent possible damage to the shaft 9 upon axial movement or radial movement of the cylinder 14. The bevelled ends 28 of the cylinder's internal bore 18 is to induce any of the sealing medium carried out on a reciprocating shaft 9 back into the cylinder 14, in other words, to avoid forming a scraping edge at the ends of the cylinder 14 that might tend to scrape the sealing medium off the rod 9. Formed on the cap 10 is an annular projection 30 which terminates a short distance from one end of the cylinder 14 to prevent endwise play thereof.

The circulating system comprises a pump 31 having a pipe connection 32 for attachment to the supply pipe 25 connected to the support 6 for the purpose of admitting a sealing medium such as oil to the central portion of the support 6 and to the space between the cylinder 14 and the inner periphery of the support. The rings 15 prevent the displacement of the sealing medium endwise of the cylinder 14. If the device is used in connection with a rotary shaft, rotation of the shaft will cause the sealing medium to enter the ports 27 and follow the shaft 9 toward the ends of the cylinder 14, where it will be received in the annular pockets 19. Centrifugal force will expel the liquid or sealing medium through the opening 20 and allow the liquid to find its way between the rings 15 to the outlet 21.

The oil or sealing medium is then returned to the sump 40 of the pump 31 by means of the return pipes 22. Interposed in one of the pipes 22 is a reservoir 41 having a conical top wall 42 and a conical bottom wall 43. Screw threaded connections 44 and 45 connect the pipe 22 to the opposite ends of the reservoir. Slidably mounted in the reservoir is a float chamber 46 mounted for sliding movement on oppositely extending guide pins 47. The guide pins operate in tubular guides 48 and 49 which are spaced so as to allow the float 46 vertical movement toward each end of the casing or reservoir 41.

Cooperating with the guide 48 is a valve 50 which is adapted to close the opening through the guide when the float 46 is in its elevated position. A similar valve 51 is formed on the guide 47 below the valve 50 and cooperates with the tubular guide 49 to close the passage therethrough when the float is in its lowermost position.

In this manner, a trap is formed between the exhaust side of the sealing device and the sump of the pump so that gases will not escape into the oil circulating system and the trap chamber will always supply a sealing medium to the pump for circulation through the sealing device.

It may be found that in some machines, steam engines, for instance, that some inexpensive medium like water may be found to make an effective seal around a shaft, and it may be found in some cases that the means shown in the drawings for carrying away the escaped sealing medium will not be necessary as some water could no doubt escape through natural channels in a steam engine such as through the cylinder to the exhaust from the inner end of the sleeve and to drains provided for ordinary packing at the outer end.

It is to be understood that the form of the invention herewith shown and described is to be taken as the preferred embodiment of the same and that various changes in the shape, size and arrangement of parts may be resorted to without departing from the spirit and scope of the invention as claimed.

I claim:

1. A fluid seal comprising a tubular support, a shaft extending therethrough, a cylindrical member interposed between the support and shaft and having an annular cavity adjacent each end thereof in communication with the shaft, an inwardly directed flange at each end of the tubular support extending completely over the ends of the cylindrical member and terminating in proximity of the shaft, each end of the bore in the cylindrical member slightly flaring outwardly, and passageways through the tubular support and central portion of the cylindrical member for feeding a sealing medium to the annular cavities.

2. A fluid seal for shafts comprising a tubular support, a shaft extending therethrough, a cylindrical member interposed between the support and shaft and having an internal annular cavity adjacent each end thereof, an inwardly directed flange at each end of the tubular support extending completely over the ends of the cylindrical member and terminating in proximity of the shaft, each end of the bore in the cylindrical member slightly flaring outwardly, sealing rings interposed between the tubular support and cylindrical member located on opposite sides of the cavities, said cavities having openings in the outer walls thereof establishing communication with the space between the cylindrical member and tubular support, means for feeding a sealing medium centrally of the tubular support to the cavities in the cylindrical member and means for exhausting the sealing medium from the spaces in the tubular support between the sealing rings and cavities.

3. A fluid seal for shafts comprising a tubular support, a shaft extending therethrough, a cylindrical member interposed between the support and shaft and having an internal annular cavity adjacent each end, an inwardly directed flange at each end of the tubular support extending completely over the ends of the cylindrical member and terminating in proximity of the shaft, each end of the bore in the cylindrical member slightly flaring outwardly, sealing rings mounted externally on the cylindrical member on opposite sides of the cavities, means for supplying a sealing medium under pressure to the central portion of the tubular support through passageways connecting the annular cavities and return pipes connected to the tubular support between the sealing rings.

4. A fluid seal for shafts comprising a tubular support, a shaft extending therethrough, a cylindrical member mounted between the shaft and support and having internal annular cavities, an inwardly directed flange at each end of the tubular support extending completely over the ends of the cylindrical member and terminating in proximity of the shaft, sealing rings mounted on opposite sides of the annular cavities in grooves formed on the periphery of the cylindrical member, means for supplying liquid under pressure to the annular cavities, return passageways for connection with the liquid supply means and a gas trap mounted in the return passageways for preventing the escape of gas.

HOWARD D. STARR.